(12) United States Patent
Schaufelberger et al.

(10) Patent No.: US 8,757,640 B2
(45) Date of Patent: Jun. 24, 2014

(54) TRAILER FOR TRAFFIC MONITORING

(75) Inventors: Martin Schaufelberger, Wald (CH);
Andres Kellenberger, Uster (CH)

(73) Assignee: Jenoptik Robot GmbH, Monheim (DE)

( * ) Notice: Subject to any disclaimer, the term of this patent is extended or adjusted under 35 U.S.C. 154(b) by 0 days.

(21) Appl. No.: 13/557,647

(22) Filed: Jul. 25, 2012

(65) Prior Publication Data
US 2013/0026724 A1    Jan. 31, 2013

(30) Foreign Application Priority Data

Jul. 27, 2011  (DE) .................. 10 2011 052 218

(51) Int. Cl.
*B62B 7/12* (2006.01)
*G08G 1/052* (2006.01)

(52) U.S. Cl.
USPC .............................. 280/30; 340/936; 340/905

(58) Field of Classification Search
CPC .................. G08G 1/096716; G08G 1/096775; G08G 1/042; G08G 1/052; B62B 7/12
USPC .......... 280/30, 656, 654, 414.5, 491.1, 491.2, 280/491.5, 491.3; 296/168, 163, 181.3; 340/905, 908, 933, 936, 943, 938
See application file for complete search history.

(56) References Cited

U.S. PATENT DOCUMENTS

| | | | |
|---|---|---|---|
| 5,137,297 A * | 8/1992 | Walker | 280/656 |
| 5,231,393 A | 7/1993 | Strickland | |
| 6,317,058 B1 * | 11/2001 | Lemelson et al. | 340/910 |
| 6,556,916 B2 * | 4/2003 | Waite et al. | 701/117 |
| 6,970,102 B2 * | 11/2005 | Ciolli | 340/933 |
| 7,243,979 B1 * | 7/2007 | Stene et al. | 296/168 |
| 7,633,433 B2 | 12/2009 | Behrens et al. | |
| 7,880,643 B2 * | 2/2011 | Brega et al. | 340/933 |
| 8,115,670 B2 | 2/2012 | Klein et al. | |
| 8,246,068 B2 * | 8/2012 | MacDougall | 280/491.1 |
| 2006/0182522 A1 * | 8/2006 | Bearden | 414/24.5 |
| 2008/0278365 A1 | 11/2008 | Klein et al. | |
| 2009/0102699 A1 | 4/2009 | Behrens et al. | |

FOREIGN PATENT DOCUMENTS

| | | |
|---|---|---|
| AT | 509049 A4 | 6/2011 |
| DE | 102007022373 A1 | 11/2008 |
| EP | 2048515 A1 | 4/2009 |

* cited by examiner

*Primary Examiner* — Hau Phan
(74) *Attorney, Agent, or Firm* — Abel Law Group, LLP (57) ABSTRACT

Disclosed is a trailer for traffic monitoring that comprises means which enable the wheels to be raised and lowered as well as at least one system for detecting and documenting red light and/or speed infringements arranged in such a way that it can be integrated into the body of the trailer.

20 Claims, 11 Drawing Sheets

TRAILER FOR TRAFFIC MONITORING

The present application claims priority under 35 U.S.C. 119 of German Patent Application Ser. No. 10 2011 052 218.2, filed Jul. 27, 2011, the entire disclosure of which is expressly incorporated by reference herein.

BACKGROUND OF THE INVENTION

1. Field of the Invention

The invention relates to a trailer for traffic monitoring, by means of which methods for detecting and documenting red light and/or speed infringements can be carried out, said method being of the generic kind known from DE 10 2007 022 373 A1 and EP 2 048 515 A1, the entire disclosures of which are incorporated by reference herein.

2. Discussion of Background Information

In addition to traffic monitoring systems set up in a fixed location, mobile traffic monitoring devices are also being used. Compared with fixed devices, mobile devices have the advantage that they can be set up at any desired location and at any desired time in order to monitor a traffic domain. Most new monitoring systems have grown in volume to such an extent that they can now hardly be accommodated in a passenger vehicle any longer. Another disadvantage is the fact that a passenger vehicle fitted with this technology is continuously occupied.

Mobile trailer systems of the kind disclosed in U.S. Pat. No. 5,231,393 A, the entire disclosure of which is incorporated by reference herein, are used at an extremely wide variety of locations for indicating measured speeds. Devices of this kind are not suitable for recording red light and/or speed infringements.

It would be advantageous to have available an arrangement which can be set up easily at any location, making it possible to carry out detection and documentation of red light and/or speed infringements, wherein the arrangement is not intended for installation in a passenger vehicle.

SUMMARY OF THE INVENTION

The present invention provides a trailer for traffic monitoring containing a body and a chassis with a drawbar and an axle with wheels. The trailer comprises means which enable the wheels to be raised and lowered so that, in the lowered state, the trailer is ready to run and, in the raised state, the wheels are not in contact with the ground and the trailer therefore rests on the ground, and further comprises at least one system for detecting and documenting red light and/or speed infringements, arranged in such a way that it can be integrated into the body of the trailer. The drawbar may be designed so that it can be pivoted in after being decoupled from the passenger vehicle at the location of use.

In a particularly advantageous embodiment of the trailer, a housing top unit is arranged on the body, said top unit having at least one rack, wherein the rack is designed to accept a radar device comprising a radar antenna and at least one recording unit. It may be advantageous if only the radar antenna and the recording unit are placed in the rack, and the associated additional components for detecting and documenting red light and/or speed infringements are accommodated in the body.

It has been found to be particularly advantageous if the housing top unit is designed with two racks, wherein the racks are arranged toward the front and toward the rear of the trailer and in each case at an angle of less than 45° to the drawbar, so that, when the trailer is parked at the side of and parallel to the road, the radar radiation is at an angle α of the radar axis to the direction of the roadway which is likewise less than 45°. An angle of about 30° is preferred.

If a measuring system is provided in each rack, measurements can be carried out simultaneously in both directions of travel from a single location.

Another advantageous option is obtained if a complete measuring system is installed in one rack and only a camera is installed in the other rack. It is thus possible to determine the speed of an approaching vehicle with the measuring system and, if there is an infringement, a frontal photograph or sequence of images is created using the camera situated in the same rack as the measuring system. To record the rear view of the vehicle, the camera in the other rack is then activated.

All the recording systems can be respectively coupled to an IR flash device, and they are then placed in the same rack.

To avoid a situation where the trailer stands continuously on its wheels during use, it is advantageous to relieve the load thereon. In this context, it is possible to employ telescopic supporting feet on which the trailer can be placed. The disadvantage then, however, is that the trailer is thereby raised unnecessarily. The better option is to arrange one or more pneumatic or hydraulic cylinders in such a way that the axle can be raised and hence the top unit is lowered, with the trailer then resting on the latter. Another advantageous option is obtained if the cylinders are arranged so as to engage on the axle in such a way that the axle can be pivoted thereby, thus once again lowering the trailer onto the body thereof. Since there are often irregularities at the setup location, it is particularly advantageous to combine the lowering mechanism with the telescopic supporting feet. This allows the entire trailer to be leveled in a simple manner and, furthermore, stresses on the body can thereby be reduced. It is particularly advantageous if the telescopic supporting feet can be activated individually by remote control or, alternatively, are automatically self-aligning by means of a linked leveling element.

Approximately parallel alignment of the trailer with the edge of the road is fully sufficient in order to carry out the methods disclosed in documents DE 10 2007 022 373 A1 and EP 2 048 515 A1, for example, if such radar devices and associated cameras are accommodated in the racks. The envisaged angled position of the racks guarantees a required setup angle (radar axis to the roadway) of less than 45°. Another factor favoring the system is that the radar radiation is emitted at a relatively large angle of spread (about 20° to about 40°).

BRIEF DESCRIPTION OF THE DRAWINGS

The invention will be explained in greater detail below with reference to illustrative, non-limiting embodiments in drawings, in which.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
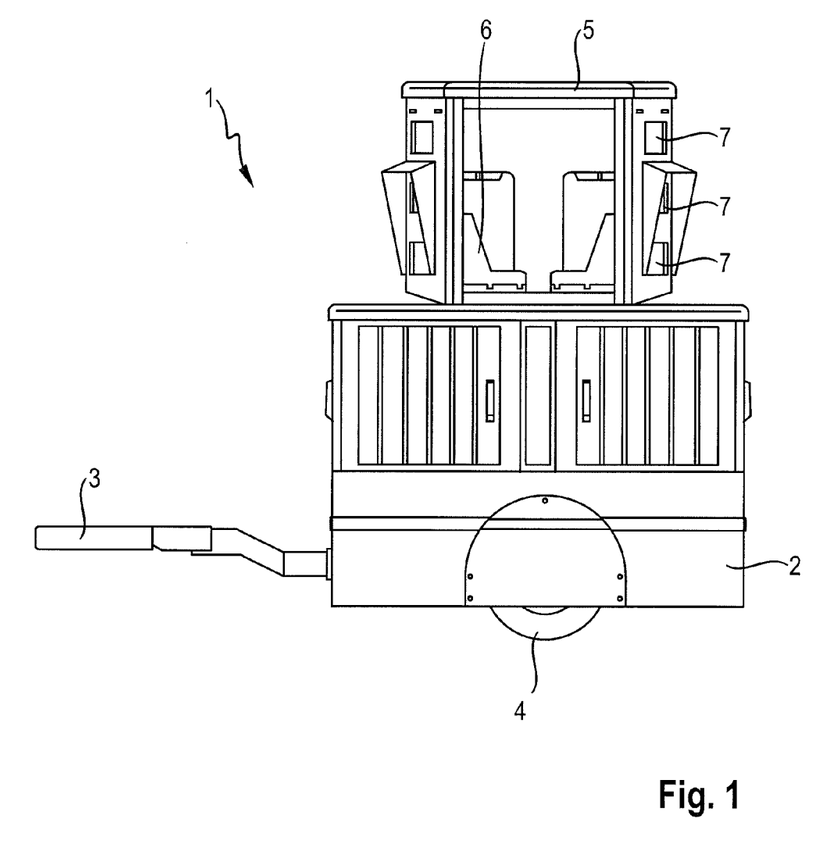
FIG. 1 shows a schematic representation of the trailer from the side
Figure 2:
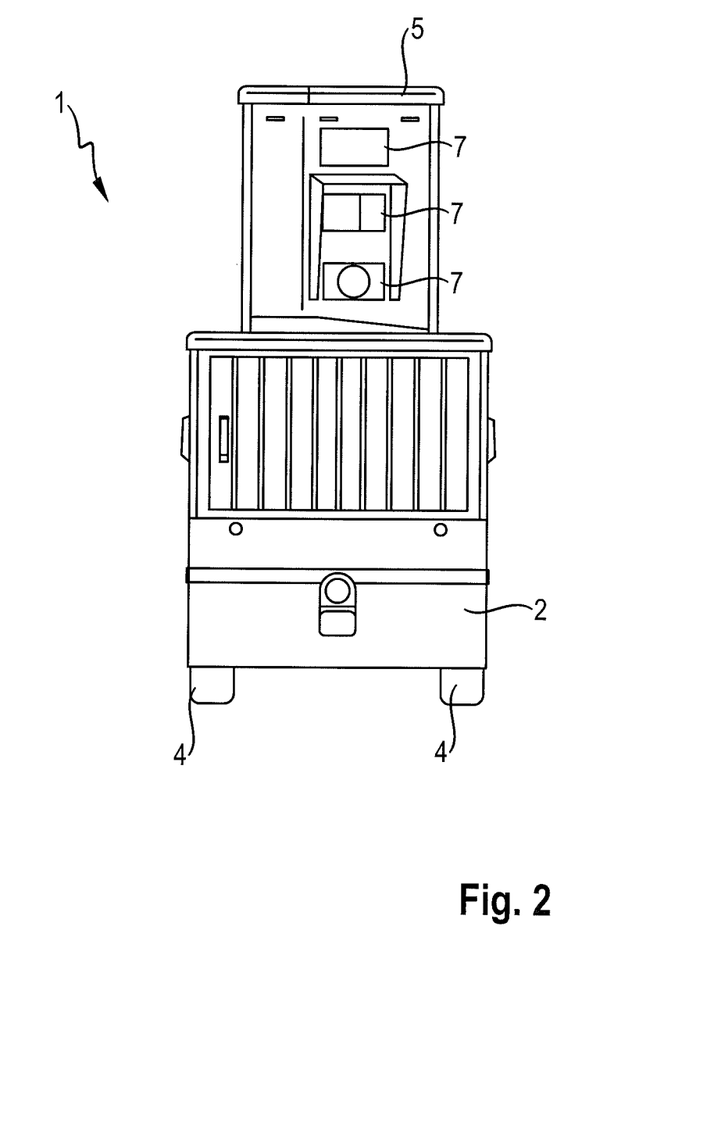
FIG. 2 shows a schematic representation of the trailer from the front
Figure 3:
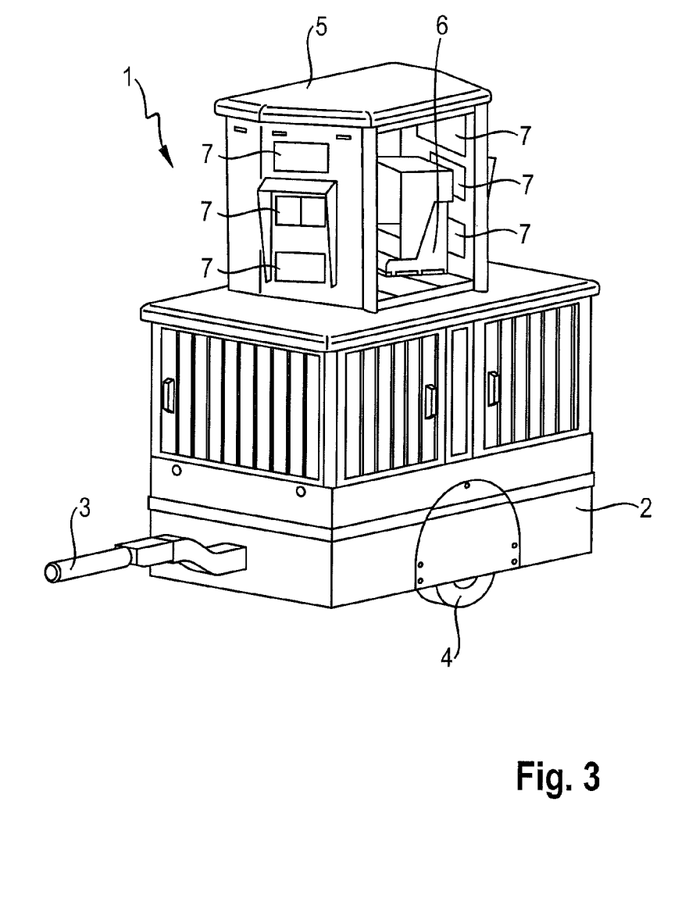
FIG. 3 shows a perspective representation of the trailer
Figure 4:
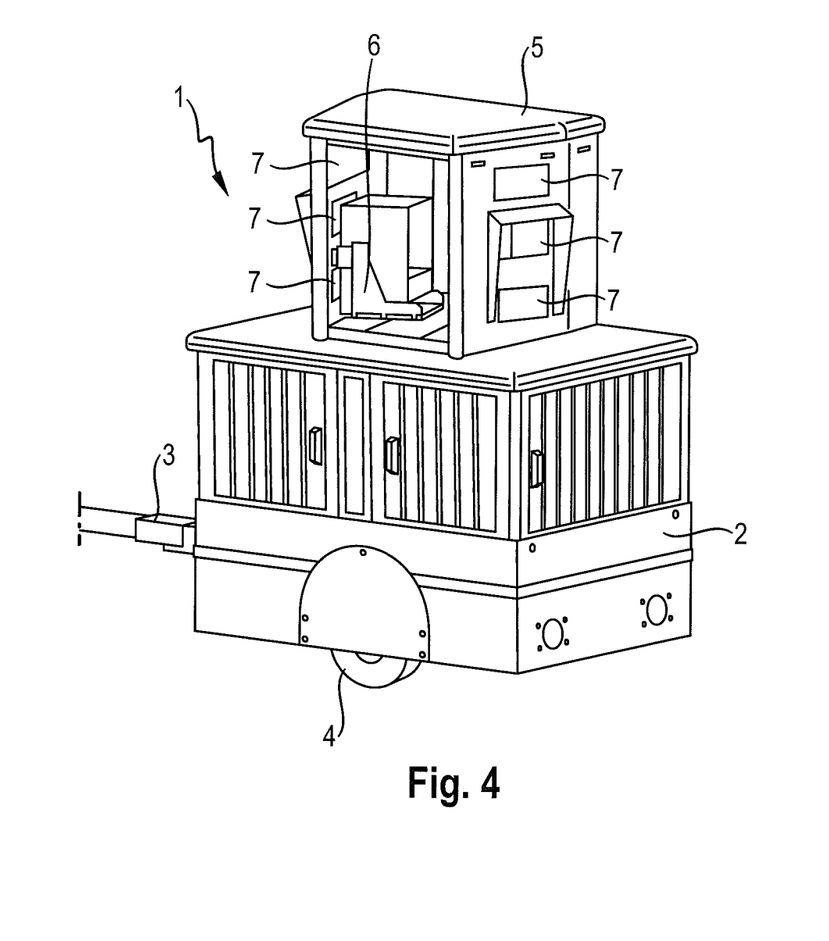
FIG. 4 shows another perspective representation of the trailer
Figure 5:
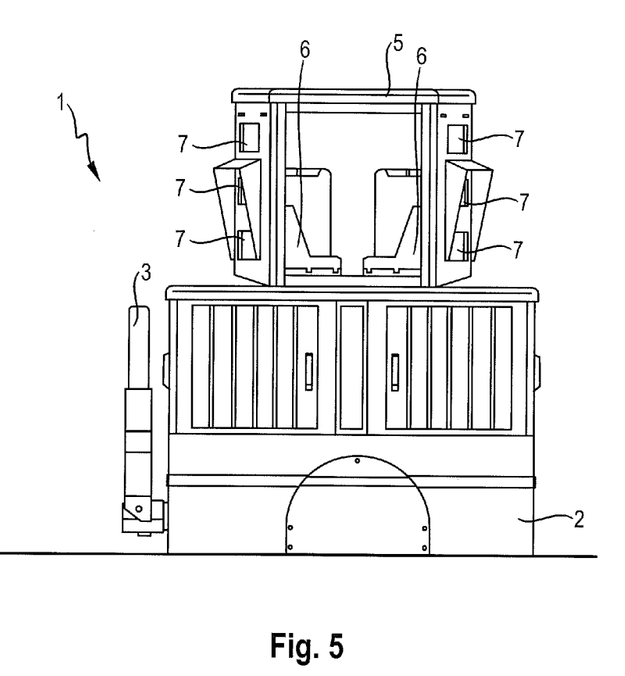
FIG. 5 shows a schematic representation of the trailer from the side in the lowered state
Figure 6:
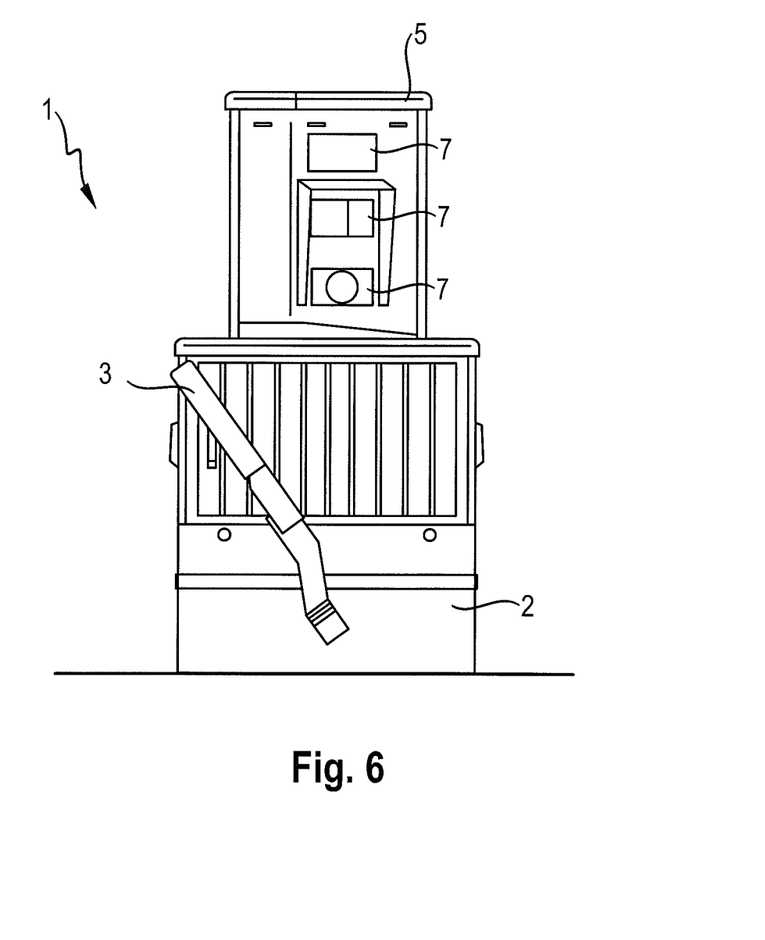
FIG. 6 shows a schematic representation of the trailer from the front in the lowered state
Figure 7:
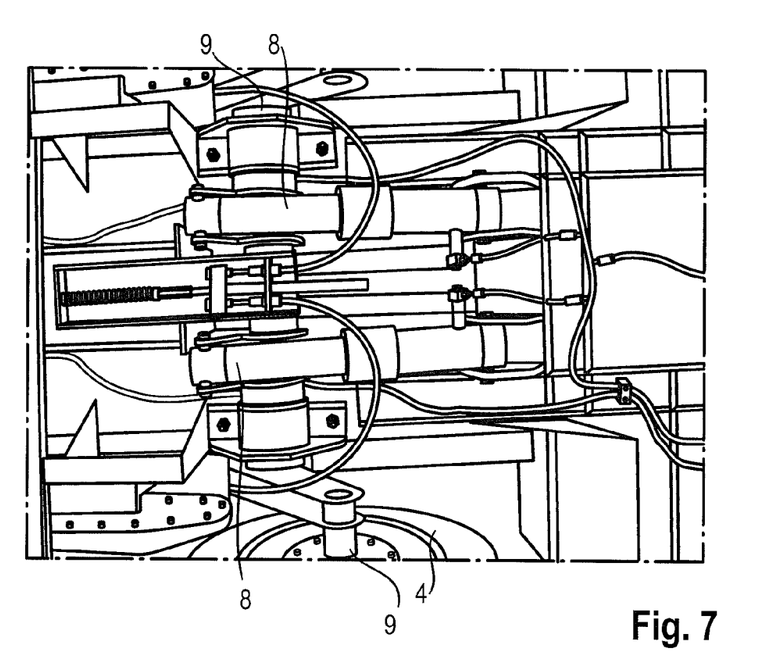
FIG. 7 shows a plan view of an axle
Figure 8:
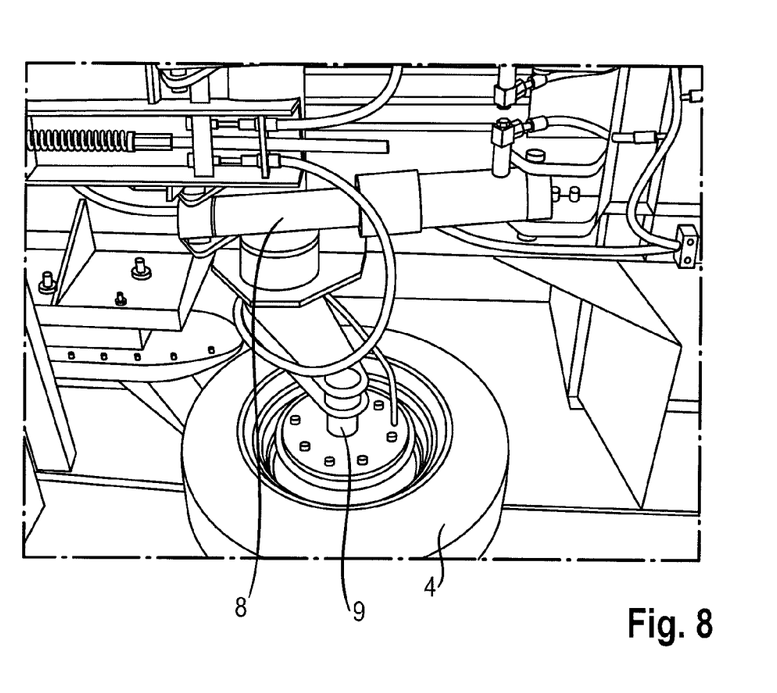
FIG. 8 shows another plan view of an axle
Figure 9:
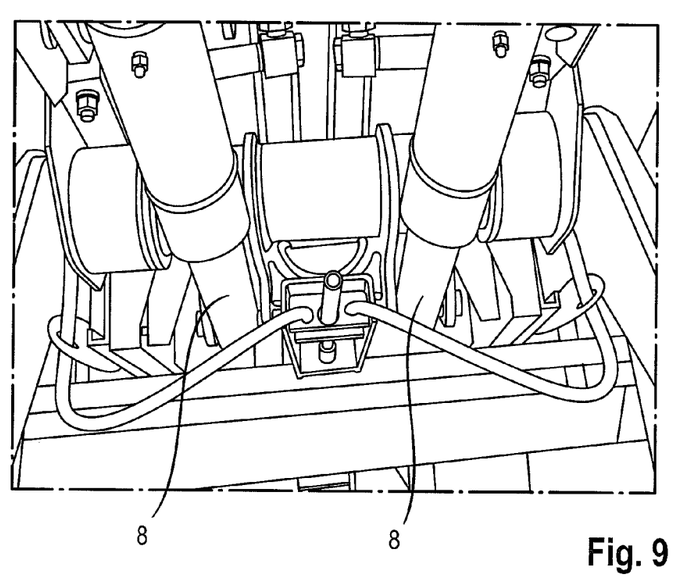
FIG. 9 shows another plan view of an axle
Figure 10:
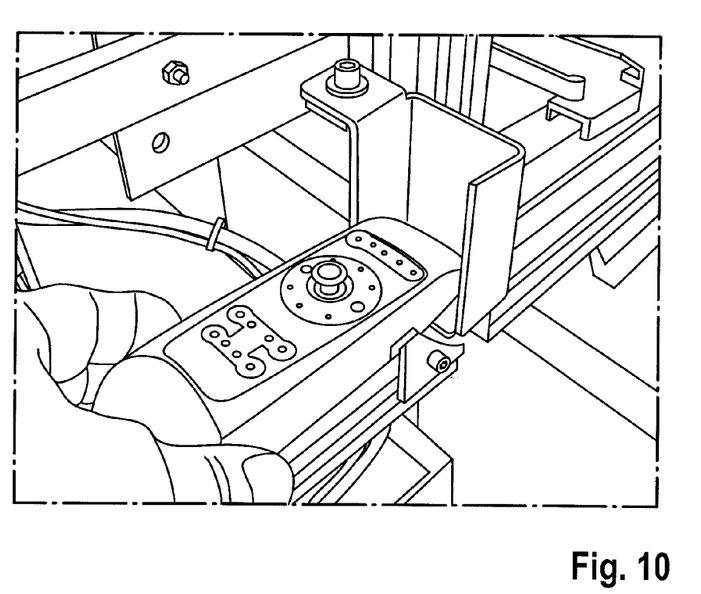
FIG. 10 shows a remote control for telescopic supporting feet
Figure 11:
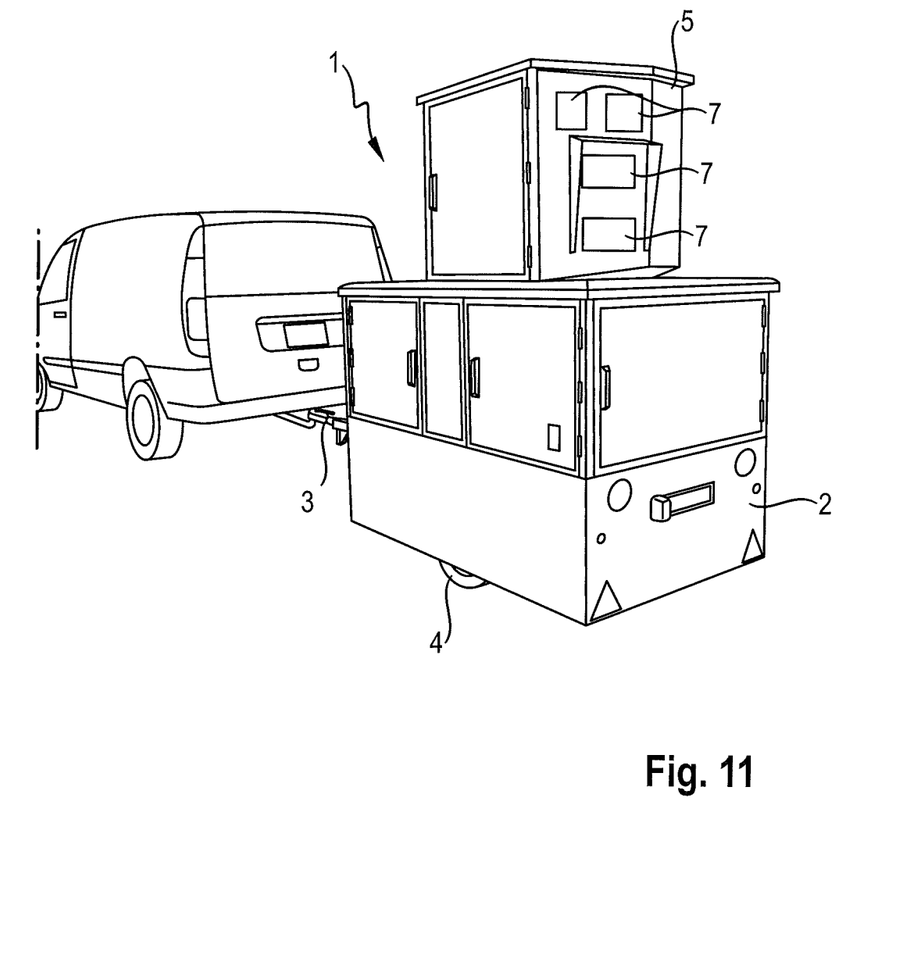
FIG. 11 shows the trailer in the ready-to-run state
Figure 12:
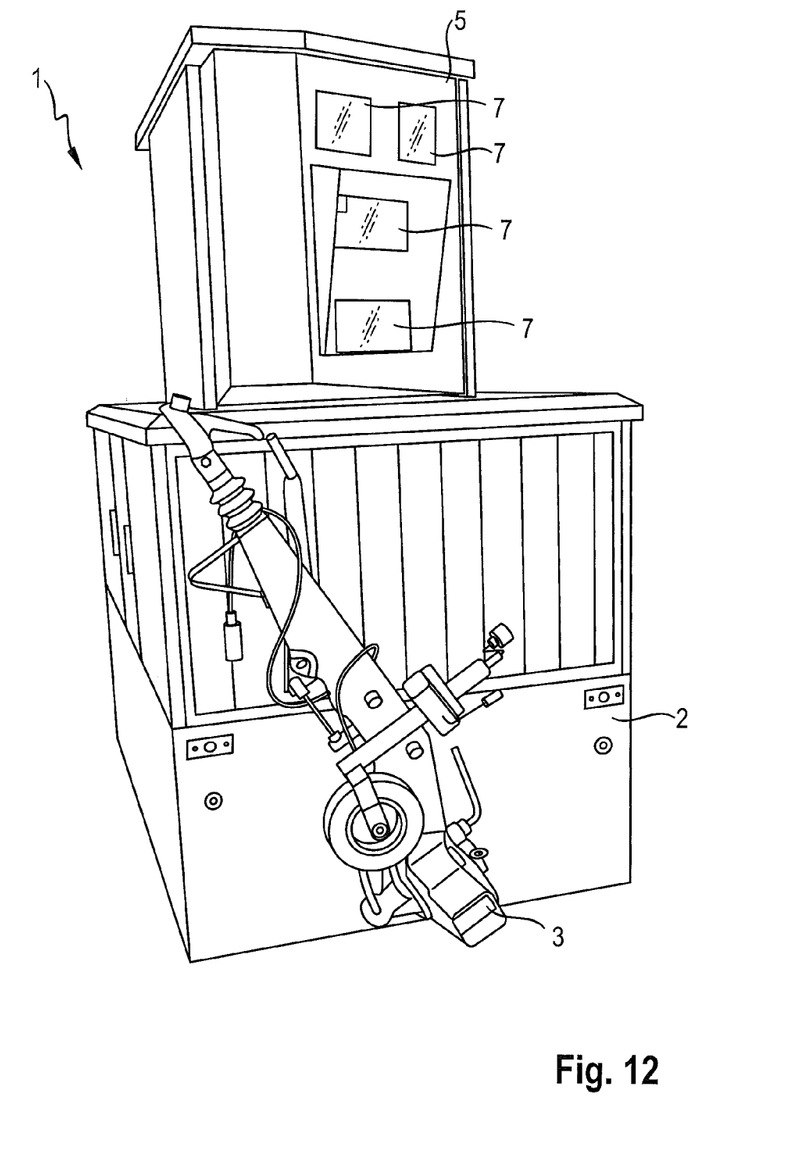
FIG. 12 shows the trailer in the set down state
Figure 13:
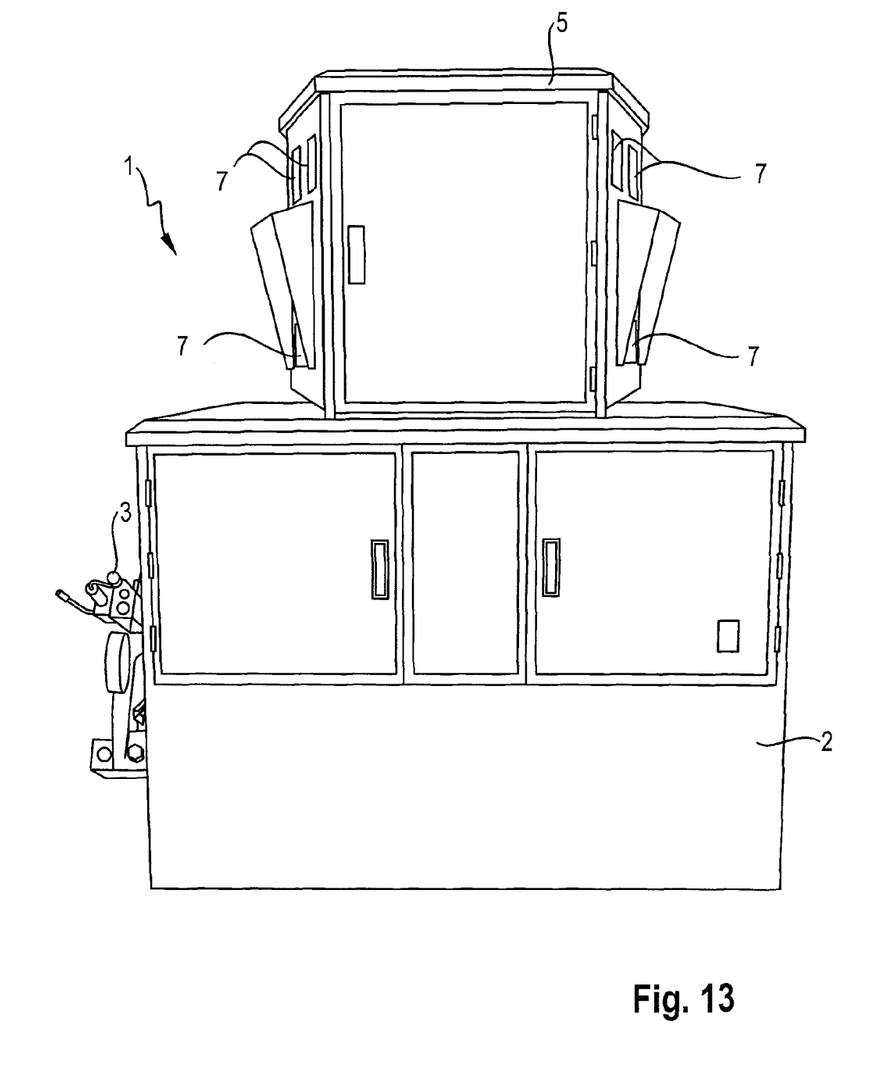
FIG. 13 shows another view of the trailer in the set down state

FIG. 1 shows the trailer 1 with the components thereof, the body 2, the drawbar 3, one wheel 4 and the housing top unit 5. Also shown are the racks 6 with the corresponding apertures 7 for the radar antenna or sensor, the recording unit and the IR flash device. The same elements appear again in FIGS. 2 to 4 but from a different perspective. FIG. 5 shows the set down state. This is what is known as the working position. Here, the movably arranged drawbar 3 is shown schematically in a raised state, allowing easier access to all the units in the front part of the trailer 1. The trailer 1 has been set down on the body 2, and it is accordingly no longer possible to see any of the wheels 4. FIGS. 7, 8 and 9 show the mechanism by means of which the wheels 4 can be raised. For this purpose, two working cylinders 8, which can be operated pneumatically or, alternatively, hydraulically, are connected to the axle 9 in such a way that, as the working cylinders 8 are retracted, the axle 9 is pivoted and hence the wheel 4 locations situated thereon can be moved upward. FIG. 10 shows the remote control installed on the trailer 1, by means of which the telescopic supporting feet (not shown) can be extended and retracted under individual control. This is particularly advantageous from two points of view. On the one hand, the lower peripheral edge of the body 2 is relieved of load and, on the other hand, it is thereby possible to level the trailer 1 in a particularly simple manner. Possible irregularities are evened out, thus likewise increasing stability. FIG. 11 shows the trailer 1 in the ready-to-run state and attached to a van. This enables the trailer 1 with its permanently installed measuring systems to be driven to any desired location for traffic monitoring. FIG. 12 shows the in-service state with the drawbar 3 correspondingly raised and the body 2 set down. FIG. 13 shows another view in the set down state. As is clear especially from FIG. 5, the racks 6 of the housing top unit 5 are arranged at an angle to the direction of running of the trailer 1 and to the direction of the drawbar axis. Simple alignment of the radar antenna or sensor is thus assured since the trailer 1 need only be set up parallel to the road to be monitored, approximate parallel alignment being fully sufficient since the radar radiation emitted has a wide angle of spread. There is a great deal more effort involved in setup if there is a different measuring system, e.g. one based on a laser, in the racks 6 since measuring systems of this kind generally do not have such an angle of spread. However, the trailer 1 is not restricted to the use of a radar device. On the contrary, the combination unites all the advantages of both systems.

The embodiment of the trailer 1 with two racks 6 allows the following options in a particularly advantageous manner:

for speed measurement, a camera is installed next to the radar device in the same rack 6, which creates frontal photographs as a master. The second rack 6 is not occupied and therefore it is not possible to create a rear photograph. Monitoring is possible in only one direction of travel in this configuration. Another embodiment consists in that the second rack 6 is fitted with another camera. This can then supply rear photographs as a slave. It is still only possible to monitor one direction of travel, with the possibility in all cases of combining the cameras with an IR flash. If the second rack 6 is likewise fitted with a complete measuring system, monitoring of both directions of travel is possible.

For red light and speed monitoring, fitting one rack with a complete measuring system and fitting the other rack 6 only with a camera is appropriate.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMBERS 1 trailer
2 body
3 drawbar
4 wheel
5 housing top unit
6 rack
7 apertures
8 working cylinders
9 axle

What is claimed is:

1. A trailer for traffic monitoring, wherein the trailer comprises a body, a chassis with a drawbar, and an axle with wheels, and further comprises
   means which enable the wheels to be raised and lowered so that, in a lowered state, the trailer is ready to run and, in a raised state, the wheels are not in contact with ground and the trailer therefore rests on the ground via the body thereof,
   at least one system for detecting and documenting at least one of red light infringements and speed infringements,
   a housing top unit arranged on the body, said top unit comprising two racks which are designed to accept a radar device comprising a radar antenna and at least one recording unit and are arranged toward a front and toward a rear of the trailer and in each case at an angle of less than 45° to the drawbar, so that, when the trailer is parked at a side of and parallel to a road, radar radiation is at an angle α of a radar axis to a direction of a roadway which is likewise less than 45°.

2. The trailer as claimed in claim 1, wherein the trailer comprises a measuring system in each rack, allowing measurements to be carried out from both directions of travel.

3. The trailer as claimed in claim 2, wherein the drawbar is arranged in a manner which allows it to be pivoted in.

4. The trailer as claimed in claim 3, wherein the trailer comprises telescopic supporting feet which are arranged so as to be adjustable in a raised state of the wheels in order to adjust the trailer and relieve a load on the body.

5. The trailer as claimed in claim 2, wherein the trailer comprises at least one pneumatic or hydraulic cylinder by means of which the wheels can be raised and lowered by rotation of an axle.

6. The trailer as claimed in claim 2, wherein the trailer comprises telescopic supporting feet which are arranged so as to be adjustable in a raised state of the wheels in order to adjust the trailer and relieve a load on the body.

7. The trailer as claimed in claim 1, wherein one rack contains a complete measuring system and the other rack contains a camera for recording a rear view of a vehicle of which a front view has already been generated by the complete measuring system.

8. The trailer as claimed in claim 7, wherein the drawbar is arranged in a manner which allows it to be pivoted in.

9. The trailer as claimed in claim 8, wherein the trailer comprises telescopic supporting feet which are arranged so as to be adjustable in a raised state of the wheels in order to adjust the trailer and relieve a load on the body.

10. The trailer as claimed in claim 7, wherein the trailer comprises at least one pneumatic or hydraulic cylinder by means of which the wheels can be raised and lowered by rotation of an axle.

11. The trailer as claimed in claim 7, wherein the trailer comprises telescopic supporting feet which are arranged so as to be adjustable in a raised state of the wheels in order to adjust the trailer and relieve a load on the body.

12. The trailer as claimed in claim 1, wherein the at least one system is capable of detecting and documenting at least red light infringements.

13. The trailer as claimed in claim 1, wherein the at least one system is capable of detecting and documenting at least speed infringements.

14. The trailer as claimed in claim 1, wherein the at least one system is capable of detecting and documenting both red light infringements and speed infringements.

15. The trailer as claimed in claim 1, wherein the drawbar is arranged in a manner which allows it to be pivoted in.

16. The trailer as claimed in claim 15, wherein the trailer comprises at least one pneumatic or hydraulic cylinder by means of which the wheels can be raised and lowered by rotation of an axle.

17. The trailer as claimed in claim 15, wherein the trailer comprises telescopic supporting feet which are arranged so as to be adjustable in a raised state of the wheels in order to adjust the trailer and relieve a load on the body.

18. The trailer as claimed in claim 1, wherein the trailer comprises at least one pneumatic or hydraulic cylinder by means of which the wheels can be raised and lowered by rotation of an axle.

19. The trailer as claimed in claim 18, wherein the trailer comprises telescopic supporting feet which are arranged so as to be adjustable in a raised state of the wheels in order to adjust the trailer and relieve a load on the body.

20. The trailer as claimed in claim 1, wherein the trailer comprises telescopic supporting feet which are arranged so as to be adjustable in a raised state of the wheels in order to adjust the trailer and relieve a load on the body.

* * * * *